United States Patent [19]

Tada et al.

[11] Patent Number: 4,803,637
[45] Date of Patent: Feb. 7, 1989

[54] CRUISE CONTROL SYSTEM FOR A VEHICLE

[75] Inventors: Tetsuya Tada; Masumi Nagasaka; Hiroaki Tabuchi, all of Toyota; Tatsuo Teratani, Aichi, all of Japan

[73] Assignee: Toyota Jidosha Kabushiki Kaisha, Aichi, Japan

[21] Appl. No.: 70,188

[22] Filed: Jul. 6, 1987

[30] Foreign Application Priority Data

Jul. 17, 1986 [JP] Japan .................. 61-166803
Jan. 31, 1987 [JP] Japan .................. 62-19641

[51] Int. Cl.⁴ ............................. B60K 31/00
[52] U.S. Cl. .................. 364/426.04; 123/352; 180/179; 364/431.07
[58] Field of Search ............. 364/426, 431.07, 431.04, 364/161, 162, 163, 165; 123/351, 352; 180/176, 177, 178, 179; 318/594

[56] References Cited

U.S. PATENT DOCUMENTS

| | | | |
|---|---|---|---|
| 3,869,019 | 3/1975 | Cardani | 180/176 |
| 3,952,829 | 4/1976 | Gray | 123/352 |
| 4,138,723 | 2/1979 | Nehmer et al. | 180/179 X |
| 4,169,437 | 10/1979 | Fleischer | 123/352 |
| 4,323,134 | 4/1982 | Gray | 180/176 |
| 4,467,428 | 8/1984 | Caldwell | 364/426 |
| 4,598,370 | 7/1986 | Nakajima et al. | 364/426 |
| 4,603,668 | 8/1986 | Ueno | 123/352 |
| 4,639,854 | 1/1987 | Kosokawa et al. | 318/611 X |
| 4,707,792 | 11/1987 | Naiton | 180/176 X |
| 4,723,213 | 2/1988 | Kawata et al. | 180/179 X |
| 4,729,104 | 3/1988 | Hara | 180/179 X |
| 4,739,485 | 4/1988 | Hayashi | 364/431.07 |

Primary Examiner—Gary Chin
Attorney, Agent, or Firm—Parkhurst, Oliff & Berridge

[57] ABSTRACT

A cruise control system for a vehicle having an internal combustion engine is provided with a throttle valve operated by a diaphragm actuator irrespective of a depression of an accelerator pedal by an operator of the vehicle. The system is provided with a control circuit for controlling an electric signal applied to the actuator. A fixed level signal is first applied to the actuator for a short period after a cruise mode operation has commenced, so that the diaphragm is quickly moved to prevent a temporary decrease in the vehicle speed. After the elapse of the predetermined time, the level of the electric signal is controlled by feedback so that the vehicle speed is controlled to a target speed. A feedback gain initially has a first value for a period after the feedback control is commenced and then has a second value which is smaller than the first value. Furthermore, the feedback gain may have a third value at a transient state from a condition where the feedback gain has the first value and a condition where the feedback gain has the second value.

6 Claims, 9 Drawing Sheets

Fig. 2A
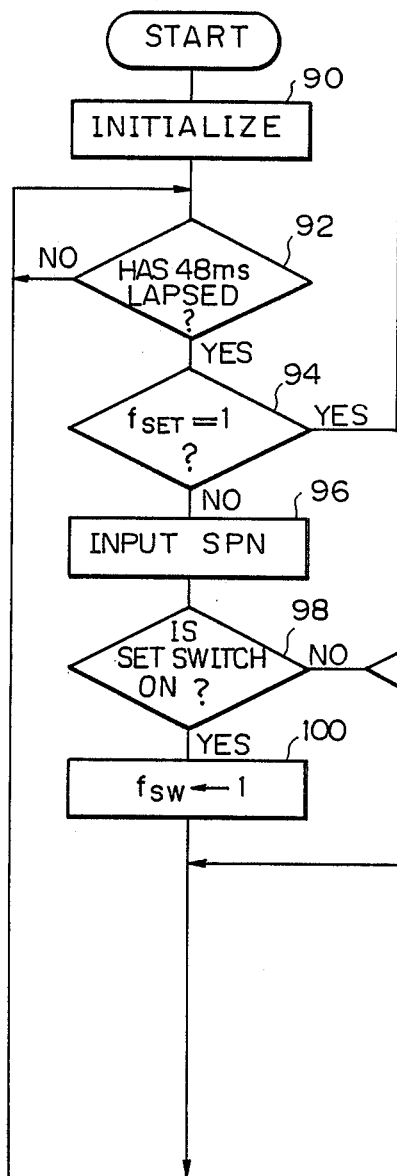
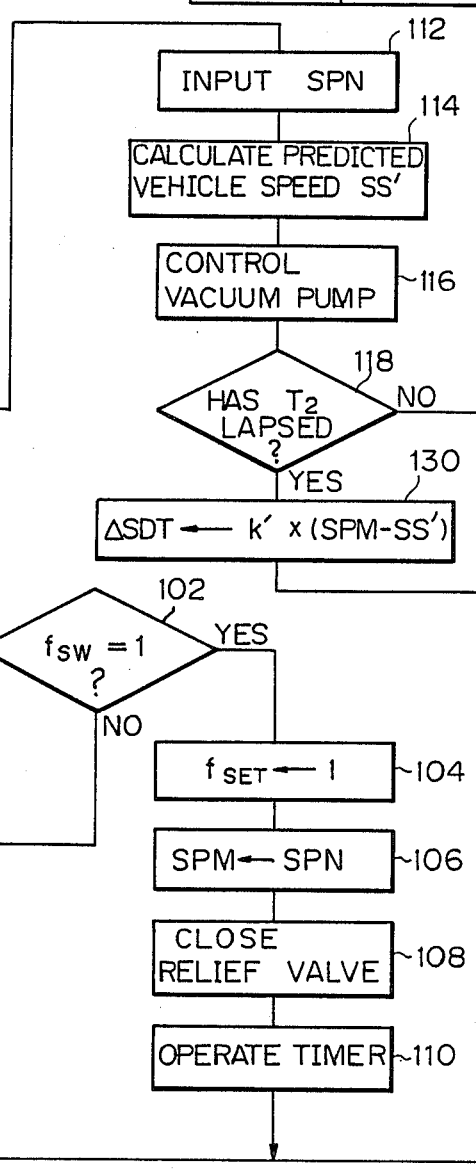

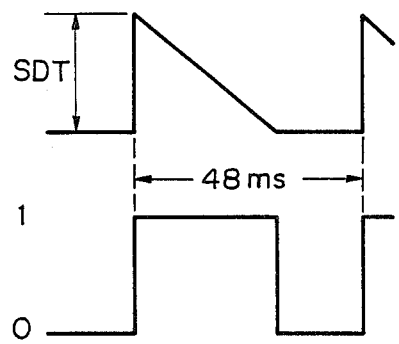
Fig. 3a VALUE OF COUNTER 86
Fig. 3b DUTY SIGNAL
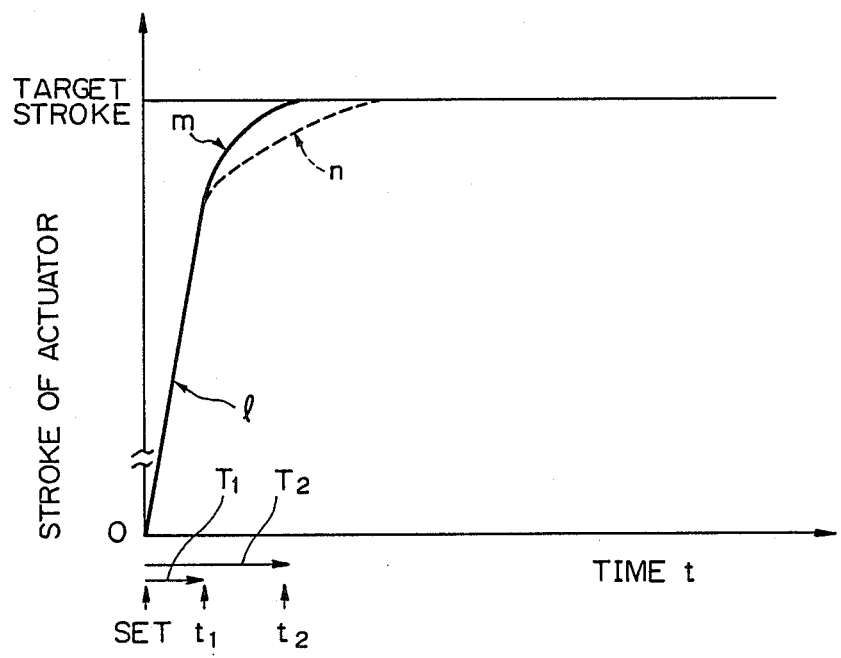
Fig. 4

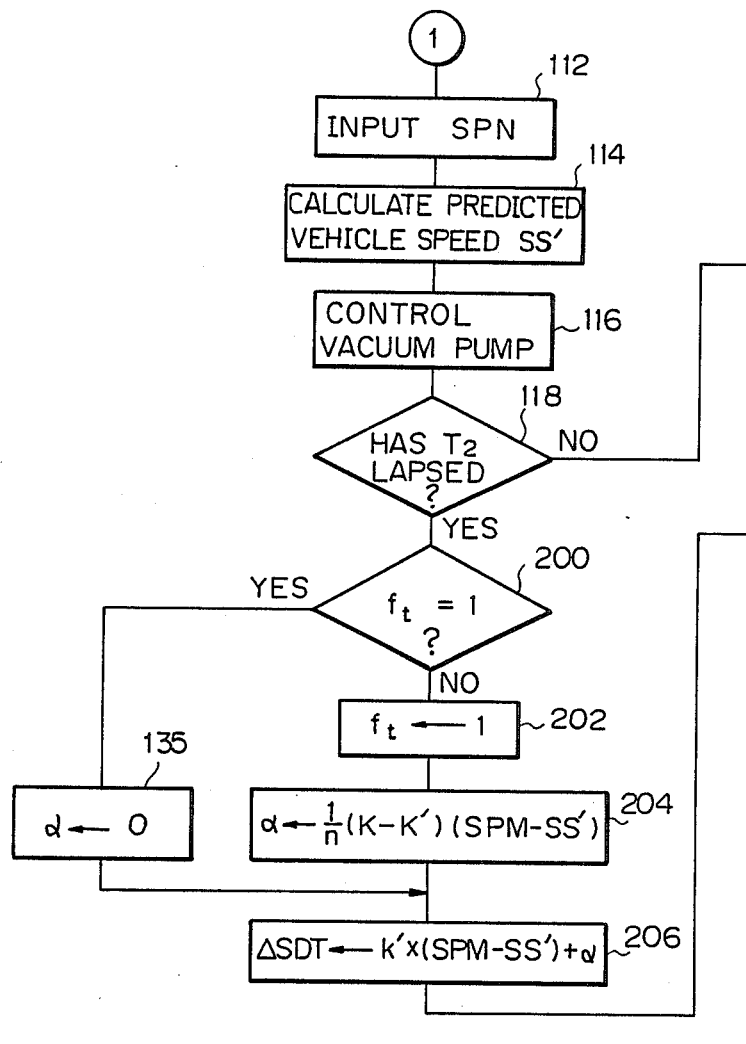

CRUISE CONTROL SYSTEM FOR A VEHICLE

BACKGROUND OF THE INVENTION

1. Field of the Invention

The present invention relates to a cruise control system for a vehicle capable of controlling any deviation to a value as small as possible.

2. Description of the Related Art

Known in the prior art is a cruise control system for an automobile provided with an internal combustion engine, wherein the cruise control system has an actuator for operating an output control member of an engine, such as a throttle valve, in such a manner that the vehicle speed is controlled to a target value when the system is in a cruise mode. The cruise control system includes a sensor, for detecting an actual speed of the vehicle, and means are provided for detecting a deviation of an actual vehicle speed from a target speed. The actuator is, for example, a vacuum actuator which is controlled by feedback to reduce the deviation. This type of system suffers from a drawback in that the engine speed temporarily drops when the cruise mode operation is commenced because of a delay in the response of the actuator. When the control of the actuator is moved from the accelerator pedal operated by the operator to the actuator, the throttle valve is temporarily closed, since the actuator operates slowly. Due to this closure of the throttle valve, a temporary decrease in vehicle speed occurs.

In order to prevent this decrease in vehicle speed when the cruise mode operation is commenced, a system has been proposed for quick control of the stroke of the actuator to a position close to a target position for obtaining the target vehicle speed. In this system, a fixed level signal is sent to the actuator for a short period after the cruise mode has commenced, so that the actuator is moved to the target position at the maximum speed (see Japanese Unexamined Patent Publication (Kokai) No. 61-44033). In this prior patent, the actuator is quickly operated so that the temporary closure movement of the throttle valve is made as small as possible. Then the feedback control is commenced to control the vehicle speed to the target value. However, this improved system still has a drawback in that there is a certain time delay before realizing the target stroke of the actuator which will allow the opening of the throttle valve after the feedback control is commenced. As a result, the vehicle speed is still temporarily decreased after the cruise mode operation has commenced.

SUMMARY OF THE INVENTION

An object of the present invention is to provide a cruise control system for a vehicle, which can prevent a temporary decrease of the vehicle speed upon commencement of the cruise mode operation.

According to the present invention, a cruise control system is provided for a vehicle having an internal combustion engine having means, such as a throttle valve, for controlling the output of the engine and an accelerator pedal connected to that engine output control means for operating same in accordance with a requirement of an operator, the system comprising:

actuator means connected to said means for controlling the engine output irrespective of the operation of the accelerator pedal by the operator;

first detecting means for detection of an actual vehicle speed;

target value setting means for setting a target vehicle speed;

second detecting means for detecting a commencement of the cruise mode operation;

electric signal forming means for forming an electric signal for operating the actuator, the vehicle speed being controlled in accordance with the condition of the electric signal;

timer means for detecting a time lapse after the commencement of the cruise mode;

first control means for controlling the electric signal forming means so as to obtain a fixed condition of the electric signal, to quickly move the actuator means and prevent the actuator from being moved back;

second control means for controlling the electric signal forming means so that the condition of the electric signal is controlled by feedback in accordance with a deviation of the actual vehicle speed from the target vehicle speed; and feedback gain control means for controlling feedback gain so that the value thereof changes in accordance with a lapse of time from the commencement of the feedback control.

BRIEF DESCRIPTION OF THE DRAWINGS

FIGS. 2, 2A, and 2B are flowcharts explaining the execution of the routines in the control circuit in FIG. 1, in the first embodiment.

FIGS. 3A and 3B show timing charts illustrating how the duty signal is obtained.

FIG. 4 shows a relationship between the time lapse after commencement of the cruise mode and the stroke of the throttle valve actuator.

FIGS. 7A, 7B, 7B-1 and 7B-2 are flowcharts explaining the execution of the routines in the control circuit in FIG. 1 in the second embodiment.

DESCRIPTION OF THE PREFERRED EMBODIMENTS

Figure 1:
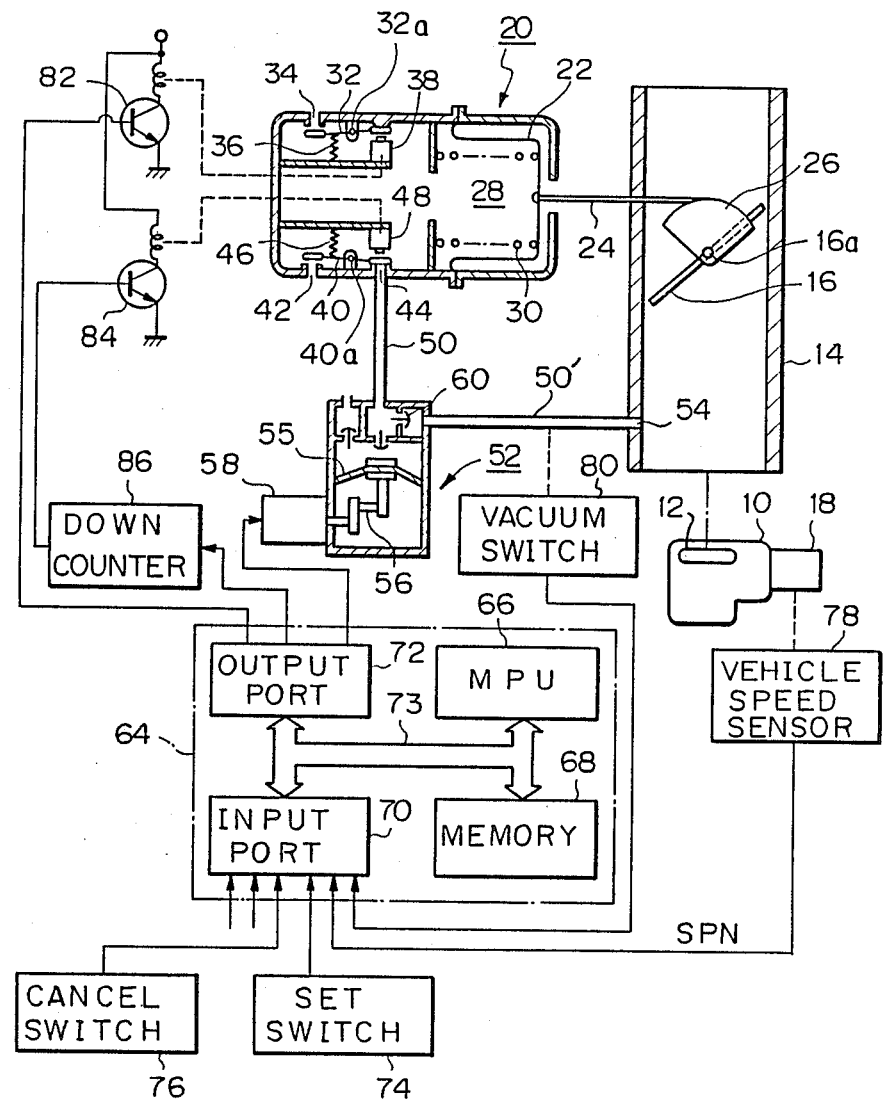
FIG. 1 is an overall schematic view of the cruise control system according to the present invention.
Figure 2B:
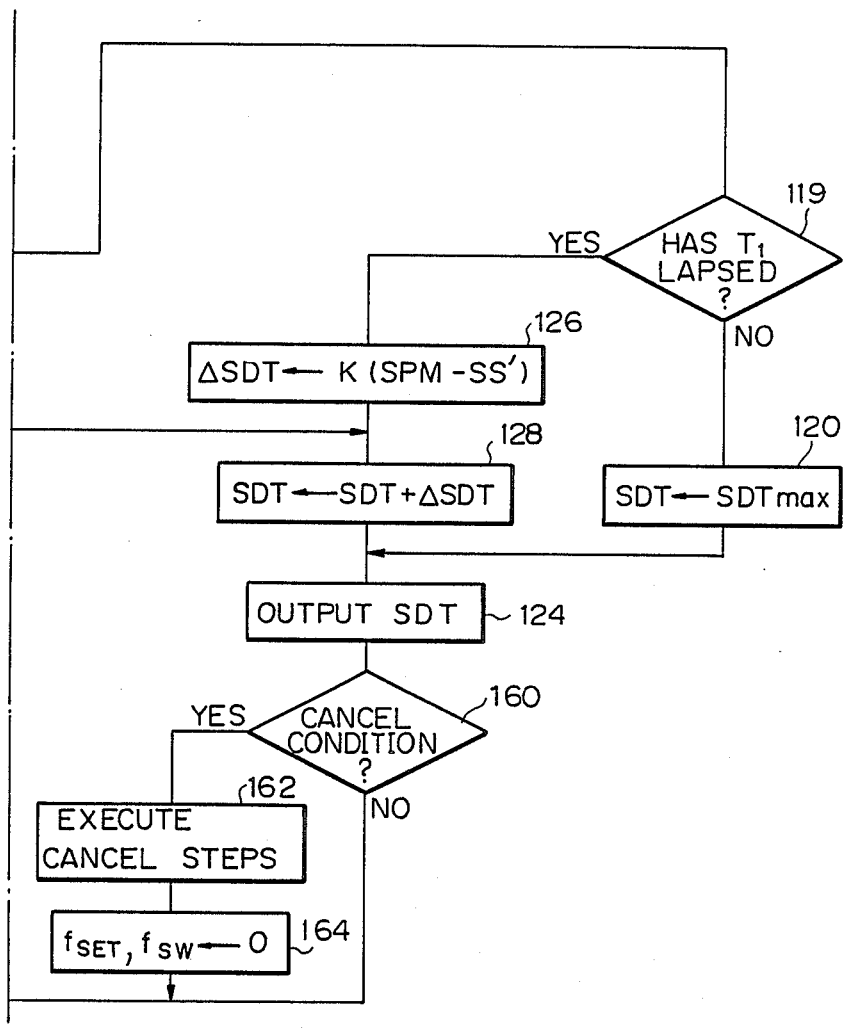

Referring to FIG. 1, numeral 10 denotes an engine body, 12 an intake manifold, 14 an intake pipe connected to the intake manifold 12, 16 a throttle valve, and 18 a transmission device for connecting the crankshaft (not shown) of the engine body 10 to a propeller shaft (not shown).

Reference numeral 20 denotes an actuator which responds to electric signals for rotating the throttle valve 16 irrespective of the depression of an accelerator pedal when the cruising apparatus is in a cruising mode. The actuator 20 is provided with a diaphragm 22 which is connected, via a connecting member 24 such as a cable, to a sector shaped lever 26 connected to a shaft 16a of the throttle valve 16. A vacuum force applied to the diaphragm causes the connecting member 24 to be wound around the outer surface of the sector shaped lever, so that the throttle valve 16 is rotated. The shaft 16a of the throttle valve 16 is connected to an accelerator pedal (not shown) by a suitable and known connecting means, to allow a desired control of degree of opening of the throttle valve in accordance with a depression of the accelerator pedal when the cruising mode operation is cancelled. When the apparatus is in the cruising mode, the degree of opening of the throttle valve 16 is controlled by the actuator 20, as will be described fully later. The actuator 20 has a diaphragm chamber 28 on one side of the diaphragm 22 remote from the connecting member 24. A spring 30 is arranged in the diaphragm chamber 28 to urge the diaphragm to move to the right in FIG. 1, so that the throttle valve 16 is closed. The actuator 20 is provided with a relief valve 32 which selectively opens or closes a relief port 34 opened to the atmosphere. A spring 36 is provided to urge the relief valve 32 to open the relief port 34 in normal operation, in such a manner that the diaphragm chamber 28 is opened to the atmosphere. When a solenoid mechanism 38 is energized, the valve member 32 is rotated around an axis 32a against the force of the spring 36 so that the relief port 34 is closed by the valve member 32. This allows the vacuum pressure in the diaphragm chamber 28 to control a control valve 40. The control valve 40 selectively opens or closes an atmospheric air pressure port 42 or a vacuum pressure port 44. The control valve 40 is urged by a spring 46 in such a manner that the atmospheric air pressure port 42 is opened when the vacuum port 44 is closed. When a solenoid 48 is energized, the control valve 40 is rotated around an axis 40a against the force of the spring 46 so that the atmospheric air pressure port 42 is closed when the vacuum port 44 is opened. This allows the diaphragm chamber 28 to be under a vacuum pressure, causing the diaphragm 22 to be displaced to the left in FIG. 1 against the force of the spring 30. Thus, the degree of opening of the throttle valve 16 is controlled in accordance with the level of vacuum pressure in the chamber 28. The vacuum chamber 28 is connected, via vacuum passageways 50 and 50', to a vacuum taking out port 54 in the intake pipe 14 of the engine. A vacuum pump 52 is arranged between the vacuum passageways 50 and 50' to generate vacuum pressure for operating the vacuum actuator 20 when the vacuum pressure at the vacuum port 54 is weak. The vacuum pump 52 is provided with a diaphragm 55, and a crank mechanism 56 is connected to the diaphragm 55 for obtaining a linear reciprocal movement of the diaphragm 55 from the rotational movement of the crank mechanism 56. The rotation of the rotary motor 58 causes the linear reciprocal movement of the diaphragm 55, to generate a vacuum in the vacuum passageway 50. When the vacuum pressure at the vacuum port 54 is high, the rotary motor 58 is stopped, so that the vacuum passageway 50 is opened to the port 54 via a check valve 60. Thus, the passageway 50 is under a vacuum pressure which is equal to that of the vacuum port 54.

A control circuit 64 is provided for controlling the operation of the cruise control system according to the present invention, and is constructed as a microcomputer system. The control circuit 64 comprises, as basic elements, a microprocessing unit (MPU), 66 of 8 or 16 bits, a memory 68, an input port 70, an output port 72, and a bus 73 for connecting these elements. Various sensors and switches are connected to the input port 70 for realizing the cruise control according to the present invention. Among these sensors and switches, those closely related to the present invention will now be explained. A set switch 74 is manually operated by an operator when starting the cruise mode operation, and this mode is commenced when the switch 74 is moved from ON to OFF, i.e., when the switch 74 is once pushed and released. A cancel switch 76 is manually operated by an operator for cancelling the cruise operation mode. A vehicle speed sensor 78 is connected to an output shaft of the transmission device 18 or to a rotational shaft of a vehicle speed meter for generating pulse signals as the shaft rotates. A vehicle speed SPN can be known from the distance between the pulse signals. A vacuum switch 80 is provided to detect a predetermined value of the vacuum level at the vacuum port 54. The selective operation of the electric rotary motor 58 of the vacuum pump 52 is effected in accordance with signals from the vacuum switch 80.

The output port 72 is connected to a transistor 82 for operating the solenoid 38 and thus operating the relief valve 32, and to a transistor 84 for operating the solenoid 48 and thus operating the control valve 40. A down counter 86 is arranged between the output port 72 and the transistor 84, to control a duration of a pulse (duty ratio) in a pulse signal sent to the transistor 84 for operating the control valve 40. The vacuum pressure level in the diaphragm chamber 28 is controlled in accordance with the duty ratio, whereby the degree of opening of the throttle valve 16 is controlled.

Figure 7A:
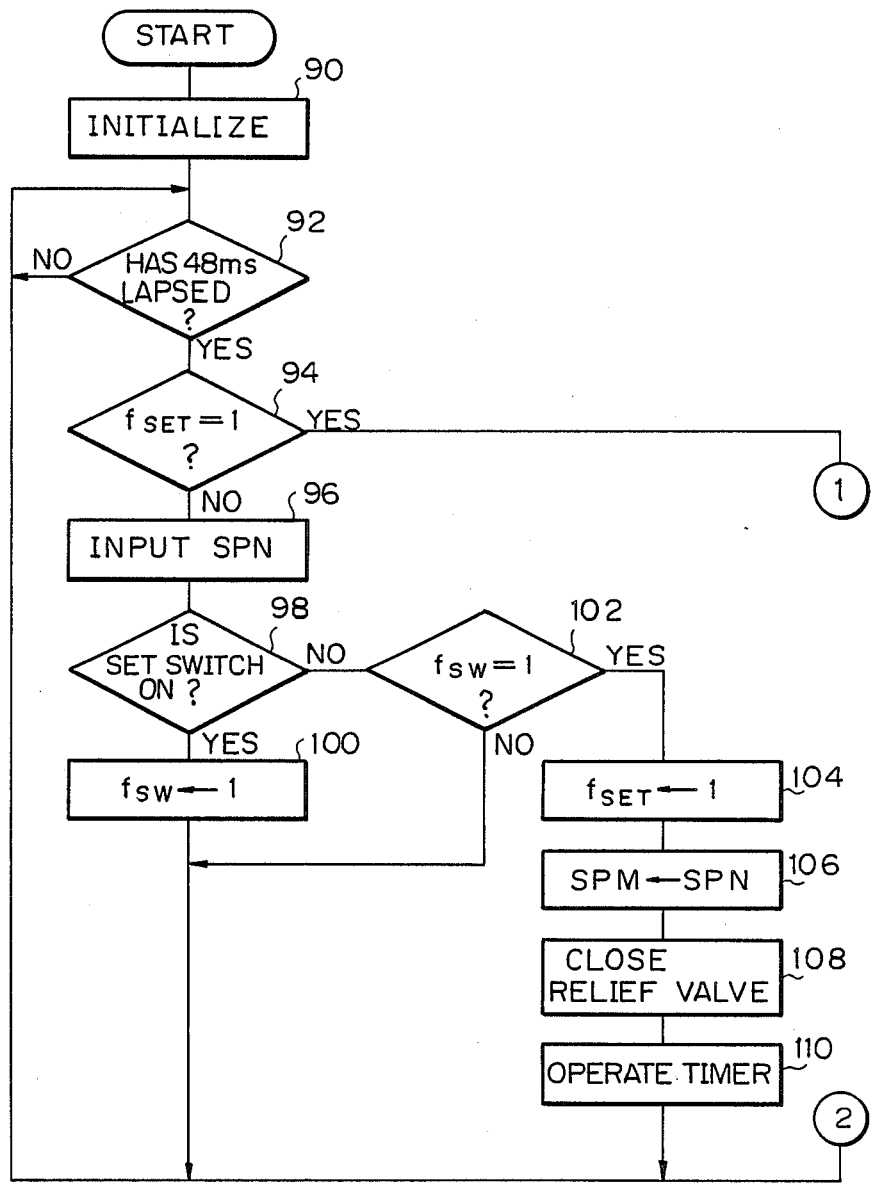
Figures 2, 7B:
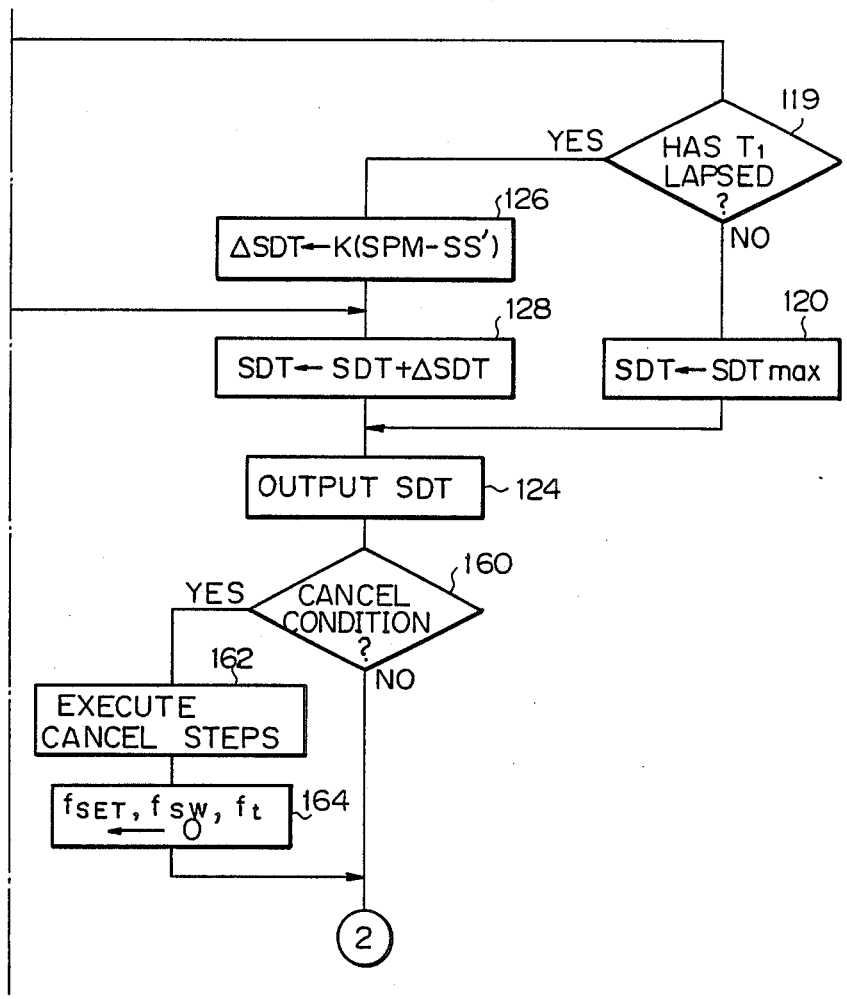

The operation of the control circuit 64 will be described with reference to flowcharts. In FIG. 2, when the routine is commenced, an initialize routine is executed at step 90, where each of the registers in the MPU 66, RAM area of the memory 66, input port 70, and output port 72, and the like are initialized. At step 92 it is determined if a predetermined waiting time of 48 milliseconds has lapsed. In other words, the routine following step 92 is executed at a time interval of 48 milliseconds. At step 94, it is determined if a flag $f_{SET}$ is set. This flag is "0" when the vehicle is in the normal running mode, and is "1" when the vehicle is in the cruise mode. In the normal running mode, the routine goes from step 94 to step 96, where an actual value of the vehicle speed SPN which is sensed by the vehicle speed sensor 78 is input. At step 98, it is determined if the set switch 74 is ON. When the set switch 74 is ON, the routine goes to step 100, where a set switch flag $f_{SW}$ is set to "1". When the set switch 74 is OFF, the routine goes to step 102, where it is determined if flag $f_{SW}$ is "1". A moment of release of the set switch 74 which has been pushed, i.e., the moment at which the set switch 74 is switched from ON to OFF, corresponds to a timing for commencement of the cruise mode. In this case the routine goes from step 102 to step 104, where the flag $f_{SET}$ is set to "1". At the next step 106, the value of the actual vehicle speed SPN sensed by the sensor 78 is moved to a RAM area of the memory 68, to store the target value of the cruising speed SPM. At the following step 108, a high level signal is sent to the transistor 82 to make it ON, thus energizing the solenoid 38 and permitting the relief valve 32 to close the relief port 34. As a result, the control of the degree of opening of the throttle valve 16 by control of the vacuum level in the diaphragm chamber 28 becomes possible. At the next step 110, a timer is started. This timer detects predetermined times $T_1$ and $T_2$ after the commencement of the cruise operation, to control the speed of movement of the diaphragm 22 so that the diaphragm quickly reaches the position corresponding to the position of the throttle valve 16 where the vehicle has a speed close to the target value SPM.

In this embodiment of the present invention, $T_1$ and $T_2$ have values in a range between 0.5 to 1 second, and in a range between 7 to 10 seconds, respectively, in accordance with the value of the target vehicle speed SPM.

When the flag $f_{SET}=1$, i.e., after the cruise mode has commenced, the routine goes from step 94 to step 112, where an actual vehicle speed SPN is input. Then, at step 114, a predicted vehicle speed SS' is calculated. The predicted vehicle speed SS' is a vehicle speed estimated at a time after a lapse of a predetermined short period from the present time, which is calculated from the present actual vehicle speed, by using the following equation, $$SS' = SPN + Kv \times (SPN - SPNX)$$

where Kv is a constant, and SPNX is an actual vehicle speed obtained at the preceding cycle. By using this predicted vehicle speed SS', a stable control can be attained irrespective of any delay in the system in the control of the vehicle speed.

At step 116, a control operation of the vacuum pump 52 is realized. This step includes operating the rotary motor 58 when it is determined from the condition of the vacuum switch 80 that a vacuum level at the vacuum port 54 is not sufficient to operate the actuator 20. When the vacuum level at the port 54 sensed by the vacuum switch 80 is high enough to operate the vacuum actuator, the rotary pump 58 is stopped.

At step 118, it is determined if a time $T_2$ has lapsed from the commencement of the cruise mode. At the initial stage, if the result of the determination at step 118 is "no", then the routine goes from step 118 to step 119, where it is determined if a time $T_1$, which is selected from a range between 0.5 to 1 second, has lapsed from the commencement of the cruise mode. When the time $T_1$ has not lapsed, then the routine goes from step 119 to step 120, where a predetermined maximum value of the duty ratio, $SDT_{max}$, is moved to SDT to store the duty ratio data in the signal for operating the control valve 40. The selection of the maximum value of the duty ratio allows the diaphragm 22 to quickly move to a position corresponding to a position of the throttle valve 16 at which the target value of the vehicle speed SPM is obtained, as will be fully described later. At the next step 124, the SDT value is sent and set to the down-counter 86, and the down-counter 86 commences the count-down. As will be seen from FIGS. 3a and 3b during the count-down, the down-counter 86 sends a high level signal, i.e., "1" signal. After the count-down of the SDT value is complete, the down-counter 86 sends a low level signal, i.e., "0" signal. In other words, the duration of the "1" signal from the down-counter 86 in relation to the time interval for realizing the routine of FIG. 2 of 48 milliseconds corresponds to the duty ratio SDT. As a result, the transistor 84 is made ON for a time period which corresponds to the calculated duty ratio SDT. Therefore, the control valve 40 opens the vacuum port 44 for a period corresponding to the duty ratio SDT, to open the diaphragm chamber 28 to the vacuum source 54 or 52 for a period corresponding to the duty ratio SDT. As a result, the diaphragm chamber 28 is subjected to a pressure which corresponds to the duty ratio SDT. Thus, the diaphragm 22 takes a position which corresponds to the calculated duty ratio SDT.

As described above, before the elapse of time $T_1$ from the commencement of the cruise mode, the value of the duty ratio SDT is set to the maximum value $SDT_{max}$, so that the speed of increase in the vacuum pressure in the diaphragm chamber 28 becomes high enough to allow the diaphragm 22 to move quickly to the left in FIG. 1 to the position at which the throttle valve 16 has an opening where the target SPM can be realized.

When the time $T_1$ has elapsed at step 119 of FIG. 2, the routine goes to step 126, where a feedback correction amount $\Delta SDT$ of the duty ratio is calculated by $$\Delta SDT = K \times (SPM - SS')$$

wherein K is a first feedback gain having a value which is larger than the value of a second feedback gain K', as will be explained later (see FIG. 5). At step 128, the duty ratio SDT is calculated as a sum of the value of SDT now stored, i.e., the duty ratio at the preceding cycle, and the feedback correction amount $\Delta SDT$.

When it is determined that the predetermined time $T_2$ has lapsed at step 118, the routine goes to step 130, where the feedback correction amount $\Delta SDT$ of the duty ratio is calculated by $\Delta SDT = K'(SPM - SS')$ where K' is a second feedback gain having a value which is smaller than the first value, so that a stable feedback control can be realized without the occurrence of hunting when the diaphragm 22 is located in a position adjacent to the target position.

Figure 6:
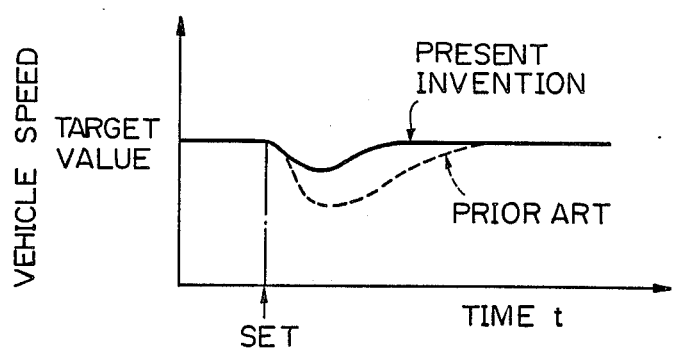
FIG. 6 shows a relationship between the time lapse and the vehicle speed.

FIG. 4 schematically illustrates the relationship between the stroke of the diaphragm 22 and the time lapse after the commencement of the cruise mode, according to the above construction of the present invention. Before the elapse of time $T_1$, the duty ratio SDT has the maximum value $SDT_{max}$ so that the diaphragm 22 is quickly controlled to a stroke close to but below the target stroke, as shown by a line l, to prevent an unnecessary overshoot of the stroke. After the lapse of time $T_1$ but before lapse of time $T_2$, a feedback control is realized under the first gain K having a large value, so that the diaphragm 22 is effectively controlled to the target stroke as shown by a line m. After the lapse of time of $T_2$, the diaphragm 22 is controlled by the second gain K' so that it is located close to the target value. In the prior art, the duty ratio is controlled only to realize the maximum value during the period of $T_1$. Therefore, sometimes delay in the control of the target value may occur, as shown by a line n, under a particular situation of the system, where the position of the diaphragm at the lapse of time $T_1$ is far from the target position, causing the vehicle speed to be temporarily decreased upon a transition from the normal running mode to the cruise mode, as shown by a dotted line in FIG. 6. Conversely, according to the present invention, a drop in the vehicle speed at the transition is effectively prevented, as shown by the solid line in FIG. 6.

Figure 5:
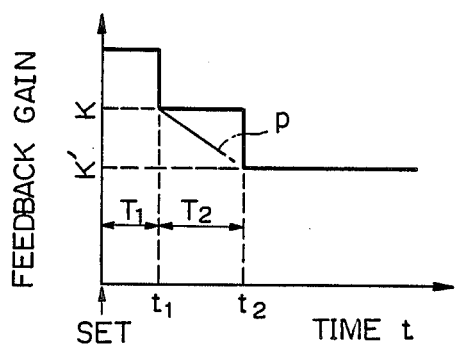
FIG. 5 shows a relationship between the time lapse and the values of the feedback gain.

Note, the first feedback gain K after the predetermined time $T_1$ has lapsed from the commencement of the cruise mode can be gradually decreased toward the second feedback gain K', as shown by a dotted line p in FIG. 5.

In FIG. 2, at step 160 it is determined if a cancel condition is in force. When the cruise mode is cancelled by, for example, making the cancel switch 76 ON or by a depression of a brake pedal (not shown), the routine goes from step 160 to step 162, where cancel steps are executed, i.e., the relief valve 32 and the control valve 40 open the atmospheric air ports 34 and 42, respectively, which causes the pressure the diaphragm chamber 28 to below the atmospheric pressure, and thus moves the diaphragm 22 to the far left in FIG. 1. At step 164, flags $f_{SET}$ and $f_{SW}$ are reset.

A second embodiment described hereinafter differs from the first embodiment in that a third feedback gain having a value between the first feedback gain and the second feedback gain is provided in order to obtain a constant torque of the engine when the system enters a normal feedback control area of the second feedback gain from the transient feedback control area of the first feedback gain. FIG. 7 is a flow chart illustrating an execution of the operation of the second embodiment of the present invention. This flow chart is very similar to FIG. 2 in the first embodiment. Therefore, only different portions thereof will be explained. Steps 92 to 110 executed when the system enters a cruise mode, to quickly move the diaphragm 22 by selecting the maximum duty ratio value, steps 119, 120, and 124 executed first during the feedback mode for taking the first value of feedback gain K, and steps 126 and 128 executed during the feedback mode under the lower second feedback gain K' are the same as the corresponding steps in FIG. 2 in the first embodiment.

As in the first embodiment, before the elapse of the time of $T_2$ from the commencement of the cruise mode, the diaphragm 22 is moved to a position near the target stroke by setting the duty ratio SDT to the maximum value $SDT_{max}$, by executing steps 119 to 124. After the time $T_2$ has elapsed from the commencement of the cruise mode at point 118, the routine goes to step 200 where it is determined if a feedback gain control flag $f_t$ is set. This flag $f_t$ is initially cleared (0), so that a "No" at step 200 means that the time $T_1$ has just elapsed from the commencement of the cruise mode. In this case, the routine goes to step 202, where this flag $f_t$ is set (1), and to step 204 where a feedback gain correction amount $\alpha$ is calculated by $$\alpha = (1/n) \times (K - K') \times (SPM - SS')$$

where n is a weight factor. Then, at the following step 206, the duty ratio correction amount $\Delta SDT$ is calculated by the following equation.

$$\Delta SDT = K' \times (SPM - SS') + \alpha$$

Figure 8:
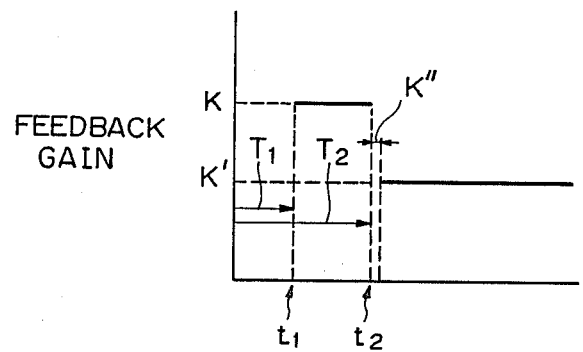
FIG. 8 shows a relationship between the time lapse and the values of feedback gain in the second embodiment.

In this case, a feedback gain K' as calculated has, as shown in FIG. 8, a third value between the first gain K and the second gain K'. The duty ratio correction value $\Delta SDT$ as calculated at step 206 is, in view of the $\alpha$ calculated at step 204, expressed by $$\begin{aligned}\Delta SDT &= ((1/n) \times (K - K') + K') \times (SPM - SS') \\ &= k'' \times (SPM - SS'),\end{aligned}$$

wherein $k'' = (1/n) \times (K - K') + K'$, and the value of n is selected so that the value of the third gain k" is between the values of the first gain K and second gain K'.

At the following cycle, the result at step 200 is "Yes", since the flag $f_t$ is set at the preceding cycle at step 202. Thus, the routine goes to step 135, where the feedback gain correction amount $\alpha$ becomes zero. Therefore, the feedback gain at step 206 has the second value K'. As will be clear from the above, the feedback gain temporarily has an intermediate third value K" when the above-mentioned period $T_2$ has just elapsed, and then has the second value K', as will be seen from FIG. 8.

Figure 9A:
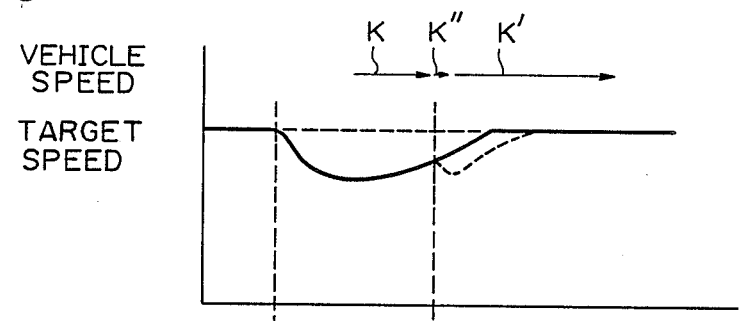
FIGS. 9A and 9B show relationships between the time lapse and the vehicle speed and between the time lapse and output torque.
Figure 9B:
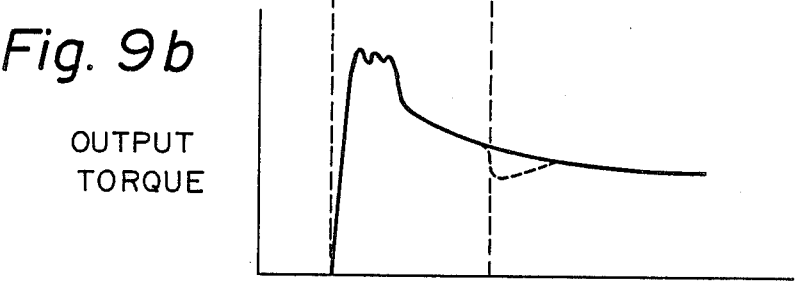

FIGS. 9a and 9b show the change of actual vehicle speed and engine torque, respectively, in the second embodiment, after the cruise mode operation has commenced, in comparison with the first embodiment. In the first embodiment, the feedback gain is directly changed from the first value K to the second value K' upon the lapse of time $T_2$, as already explained in relation to FIG. 5. Due to the large drop in value of the feedback gain, the engine torque is temporarily decreased, as shown by a dotted line, causing a drop in the vehicle speed, as shown by the dotted line. Contrary to this, according to the second embodiment, the feedback gain temporarily has the third value K" intermediate between the first and second values K and K', when the time $T_2$ has just elapsed. Therefore, an abrupt change in feedback gain is prevented, so that a drop in the engine torque and vehicle speed does not occur.

Although the present invention is described with reference to the attached drawings many modification and changes can be made by those skilled in this art without departing from the scope and spirit of the present invention.

We claim:

1. A cruise control system for a vehicle having an internal combustion engine, an engine output control member, and an accelerator pedal connected to said engine output control member for operating said engine output control member in accordance with a requirement by an operator, said system comprising:

actuator means connected to said engine output control member for controlling engine output without operation of said accelerator pedal by an operator;

first detecting means for detecting an actual vehicle speed;

target value setting means for setting a target vehicle speed to be maintained by said cruise control system;

second detecting means for detecting commencement of a cruise control mode of operation;

electric signal forming means for forming electric signals for operating the actuator means and thereby controlling engine output and vehicle speed;

timer means for detecting first and second predetermined time lapses after detection of commencement of the cruise control mode of operation by said second detecting means;

first control means for controlling said electric signal forming means, prior to detection of said first predetermined time lapse by said timer means, so as to form a fixed level electric signal for quickly moving the actuator means to prevent a temporary decrease of the vehicle speed;

second control means for calculating feedback factors based upon deviations between the actual vehicle speed detected by said first detecting means and the target vehicle speed set by said target value setting means, and for controlling said electric signal forming means, after detection of said first predetermined time lapse by said timer means, so as to form electric signals which are modified by said feedback factors; and feedback gain control means for controlling gain of said feedback factors so that a value of said gain deceases after detection of said second predetermined time lapse by said timer means, whereby a quick and stable feedback control is realized.

2. A system according to claim 1, wherein said feedback gain control means comprises:

first feedback gain control means for controlling said gain of said feedback factors so that said gain has a first predetermined value before detection of said second predetermined time lapse by said timer means, in order to attain a quick control of the vehicle speed to the target speed; and second feedback gain control means for controlling said gain of said feedback factors so that said gain has a second predetermined value smaller than the first predetermined value after detection of said predetermined time lapse by said timer means, in order to attain stable feedback control when the actual vehicle speed is close to the target vehicle speed.

3. A system according to claim 2, wherein upon detection of said second predetermined time lapse by said timer means, said gain is immediately changed from said first predetermined value to said second predetermined value.

4. A cruise control system according to claim 2, further comprising:

third feedback gain control means for controlling said gain of said feedback factors so that said gain has a third predetermined value between the first and second predetermined values;

wherein said gain has said third predetermined value after said second predetermined time lapse and before a third predetermined time lapse detected by said timer means, and said gain has said second predetermined value after said third predetermined time lapse, in order to prevent a temporary drop in vehicle speed after detection of the second predetermined time lapse.

5. A cruise control system according to claim 1, wherein said actuator means comprises:

a vacuum actuator connected to said engine output control member; and vacuum control means responsive to said electric signals for controlling a vacuum level in the vacuum actuator for controlling vehicle speed.

6. A cruise control system according to claim 1, wherein said electric signal forming means produces pulse signals, and a duty ratio of the pulse signals corresponds to said gain of said feedback factors.

* * * * *